(12) United States Patent
Kojima et al.

(10) Patent No.: US 8,345,150 B2
(45) Date of Patent: Jan. 1, 2013

(54) IMAGING APPARATUS

(75) Inventors: Hiroyuki Kojima, Osaka (JP); Toshihito Egami, Osaka (JP); Eiji Anno, Nara (JP)

(73) Assignee: Panasonic Corporation, Osaka (JP)

( * ) Notice: Subject to any disclaimer, the term of this patent is extended or adjusted under 35 U.S.C. 154(b) by 215 days.

(21) Appl. No.: 12/842,236

(22) Filed: Jul. 23, 2010

(65) Prior Publication Data

US 2011/0019069 A1 Jan. 27, 2011

(30) Foreign Application Priority Data

Jul. 27, 2009 (JP) ................................. 2009-174073

(51) Int. Cl.
*G03B 7/00* (2006.01)
*G03B 17/00* (2006.01)
*H04N 5/235* (2006.01)
*H04N 5/228* (2006.01)
*H04N 5/238* (2006.01)

(52) U.S. Cl. ................. 348/362; 348/208.99; 348/208.2; 348/208.12; 348/208.16; 348/363; 396/52; 396/53

(58) Field of Classification Search .......... 348/208.99–208.16, 222.1, 234–238, 348/241, 362–368, 373–376; 382/254–255, 382/274–275; 396/52–55, 63–64
See application file for complete search history.

(56) References Cited

U.S. PATENT DOCUMENTS

| | | | | |
|---|---|---|---|---|
| 6,272,289 B1 * | 8/2001 | Washisu | ........................... | 396/55 |
| 2001/0010544 A1 * | 8/2001 | Wakui | ........................... | 348/208 |
| 2002/0146245 A1 * | 10/2002 | Masuda | ........................... | 396/50 |
| 2004/0090532 A1 * | 5/2004 | Imada | ........................ | 348/208.16 |
| 2004/0239771 A1 * | 12/2004 | Habe | ......................... | 348/208.12 |
| 2005/0128310 A1 * | 6/2005 | Egawa | ..................... | 348/208.12 |
| 2005/0200744 A1 * | 9/2005 | Kobayashi | ..................... | 348/362 |
| 2006/0158532 A1 * | 7/2006 | Ayaki et al. | ............... | 348/229.1 |
| 2006/0170816 A1 * | 8/2006 | Silverstein et al. | ........... | 348/362 |
| 2006/0197866 A1 * | 9/2006 | Fujimoto | ...................... | 348/362 |
| 2007/0019937 A1 * | 1/2007 | Endo | ............................... | 396/52 |
| 2007/0183765 A1 * | 8/2007 | Imamura | ......................... | 396/55 |
| 2007/0206935 A1 * | 9/2007 | Ono | .................................. | 396/55 |
| 2007/0206941 A1 * | 9/2007 | Maruyama et al. | ........... | 396/153 |
| 2007/0212043 A1 * | 9/2007 | Izawa | .............................. | 396/55 |
| 2007/0237506 A1 * | 10/2007 | Minema et al. | ................. | 396/52 |
| 2008/0094498 A1 * | 4/2008 | Mori | .............................. | 348/352 |

(Continued)

FOREIGN PATENT DOCUMENTS

JP 2622485 B 4/1997

(Continued)

*Primary Examiner* — Jason Chan
*Assistant Examiner* — Michael Osinski
(74) *Attorney, Agent, or Firm* — Panasonic Patent Center

(57) ABSTRACT

An imaging apparatus includes an imaging unit operable to capture a subject image via an optical system and generate image data, a regulating unit operable to regulate an exposure amount for the imaging unit; a shake detector operable to detect a shake of the imaging apparatus; an operation unit capable of being in a first operating state and a second operating state; and a controller operable to control the recording unit to record the image data generated by the imaging unit in the recording medium, when the operation unit is in the first operating state. The controller determines whether or not the operation unit is in the second operating state before the first operating state, and regulates an exposure time of the regulating unit based on the determination result and the shake of the imaging apparatus detected by the shake detector.

11 Claims, 8 Drawing Sheets

| ILLUMINANCE | LEVEL OF IMAGE BLUR | LOWER LIMIT OF SHUTTER SPEED (sec) | |
|---|---|---|---|
| | | HALF PRESS IS PERFORMED | HAFL PRESS IS NOT PERFORMED |
| LOW ILLUMINANCE (EV0~2) | 0 | 1/2~1/8 (VARY WITH ILLUMINANCE) | 1/15 |
| | 1 | 1/2~1/8 (VARY WITH ILLUMINANCE) | 1/15 |
| | 2 | 1/2~1/8 (VARY WITH ILLUMINANCE) | 1/15 |
| | 3 | 1/30 | 1/30 |
| NORMAL ILLUMINANCE (BRIGHTER THAN EV2) | 0 | 1/8 | 1/15 |
| | 1 | 1/8 | 1/15 |
| | 2 | 1/15 | 1/15 |
| | 3 | 1/30 | 1/30 |

U.S. PATENT DOCUMENTS

| | | | | |
|---|---|---|---|---|
| 2009/0009614 A1* | 1/2009 | Kawai | | 348/208.12 |
| 2009/0040319 A1* | 2/2009 | Habe | | 348/208.4 |
| 2009/0167877 A1* | 7/2009 | Imamura | | 348/208.4 |
| 2009/0179994 A1* | 7/2009 | Miyazaki | | 348/208.4 |
| 2010/0277603 A1* | 11/2010 | Tsai | | 348/208.4 |

FOREIGN PATENT DOCUMENTS

| | | |
|---|---|---|
| JP | 3550608 B | 5/2004 |
| JP | 2008-209650 | 9/2008 |
| JP | 2009-239822 | 10/2009 |

\* cited by examiner

Fig. 6

| AMOUNT OF IMAGE BLUR | LEVEL OF IMAGE BLUR |
|---|---|
| 1~5 PIXELS | 0 |
| 6~10 PIXELS | 1 |
| 11~15 PIXELS | 2 |
| 16 PIXELS OR MORE | 3 |

Fig. 7

| ILLUMINANCE | LEVEL OF IMAGE BLUR | LOWER LIMIT OF SHUTTER SPEED (sec) | |
|---|---|---|---|
| | | HALF PRESS IS PERFORMED | HALF PRESS IS NOT PERFORMED |
| LOW ILLUMINANCE (EV0~2) | 0 | 1/2~1/8 (VARY WITH ILLUMINANCE) | 1/15 |
| | 1 | 1/2~1/8 (VARY WITH ILLUMINANCE) | 1/15 |
| | 2 | 1/2~1/8 (VARY WITH ILLUMINANCE) | 1/15 |
| | 3 | 1/30 | 1/30 |
| NORMAL ILLUMINANCE (BRIGHTER THAN EV2) | 0 | 1/8 | 1/15 |
| | 1 | 1/8 | 1/15 |
| | 2 | 1/15 | 1/15 |
| | 3 | 1/30 | 1/30 |

Fig. 8

| DISTINCT SCENE | LEVEL OF IMAGE BLUR | LOWER LIMIT OF SHUTTER SPEED (sec) | |
|---|---|---|---|
| | | HALF PRESS IS PERFORMED | HALF PRESS IS NOT PERFORMED |
| SCENE 1 | 0 | 1/2~1/8 (VARY WITH ILLUMINANCE) | 1/15 |
| SCENE 2 | 1 | 1/2~1/8 (VARY WITH ILLUMINANCE) | 1/15 |
| SCENE 3 | 2 | 1/2~1/8 (VARY WITH ILLUMINANCE) | 1/15 |
| SCENE 4 | 3 | 1/30 | 1/30 |
| ... | ... | ... | ... |

IMAGING APPARATUS

BACKGROUND

1. Technical Field

Technical field relates to an imaging apparatus, and particularly to an imaging apparatus for detecting shake of the imaging apparatus.

2. Related Art

Conventionally, an imaging apparatus such as digital camera has a function for preventing blur of an image due to the camera shake by detecting camera shake and moving a lens or an imaging device by an amount of the camera shake. Further, an imaging apparatus that controls exposure according to state of camera shake is known. A user using such an imaging apparatus can take a picture of which exposure is controlled according to the camera shake.

For example, Japanese Patent No. 3550608 discloses such a camera. In the camera disclosed in Japanese Patent No. 3550608, when a release button is half pressed, start of a detecting operation of a camera shake detecting unit is instructed, and when the release button is fully pressed, start of driving an optical system for correcting a camera shake is instructed. When the release button is half pressed to instruct the start of the detection of the camera shake detecting unit, the camera disclosed in Japanese Patent No. 3550608 changes a shutter speed according to a time until the full press of the release button to instruct the start of the driving the optical system for correcting a camera shake.

In general, as an exposure time is longer, blur of a subject image occurs more easily. In Japanese Patent No. 3550608, a time from the half press to the full press of the release button is measured, and the shutter speed is changed according to the measured time. However, the camera shake at the time of user's operation of the release button is not taken into consideration, and thus it is impossible to suitably control the exposure in consideration of the camera shake.

To solve the above problem, and an imaging apparatus is provided that can suitably control exposure according to a user's operating condition.

SUMMARY

In a first aspect, an imaging apparatus is provided, which includes an imaging unit operable to capture a subject image via an optical system and generate image data, a recording unit operable to record the image data generated by the imaging unit in a recording medium, a regulating unit operable to regulate an exposure amount for the imaging unit, a shake detector operable to detect a shake of the imaging apparatus, an operation unit capable of being in a first operating state and a second operating state, and a controller operable to control the recording unit to record the image data generated by the imaging unit in the recording medium, when the operation unit is in the first operating state. The controller determines whether or not the operation unit is in the second operating state before the first operating state, and regulates an exposure time of the regulating unit based on the determination result and the shake of the imaging apparatus detected by the shake detector.

In a second aspect, an imaging apparatus is provided, which includes an imaging unit operable to capture a subject image via an optical system and generate image data, a recording unit operable to record the image data generated by the imaging unit in a recording medium, a regulating unit operable to regulate an exposure amount for the imaging unit, an acquiring unit operable to acquire information about a shake of the imaging apparatus, an operation unit capable of being in a first operating state and a second operating state, and a controller operable to control the recording unit to record the image data generated by the imaging unit in the recording medium, when the operation unit is in the first operating state. The controller determines whether or not the operation unit is in the second operating state before the first operating state, and regulates an exposure time of the regulating unit based on the determination result and the information about the shake of the imaging apparatus acquired by the acquiring unit.

According to the above aspect, the imaging apparatus determines a user's operating condition, and sets the exposure time based on the operating condition and the detected shake of the imaging apparatus. As a result, in the imaging apparatus, suitable exposure control can be realized according to the operating condition.

BRIEF DESCRIPTION OF DRAWINGS

FIG. 6 is a diagram describing a process for determining a level of image blur.

FIG. 7 is a diagram describing an example of variable values of a lower limit of shutter speed.

FIG. 8 is a diagram illustrating an example of variable values of a lower limit of shutter speed set for each of recognized scenes.

DETAILED DESCRIPTION OF PREFERRED EMBODIMENT

Preferred embodiments will be described below with reference to the accompanying drawings.

First Embodiment

A digital camera 100 according to a first embodiment monitors a state of image blur and half press of a release button 201, and regulates an exposure time according to them. A configuration and an operation of the digital camera 100 will be described below.

1. Configuration of the Digital Camera

A configuration of the digital camera 100 will be described below with reference to the drawings.

Figure 1:
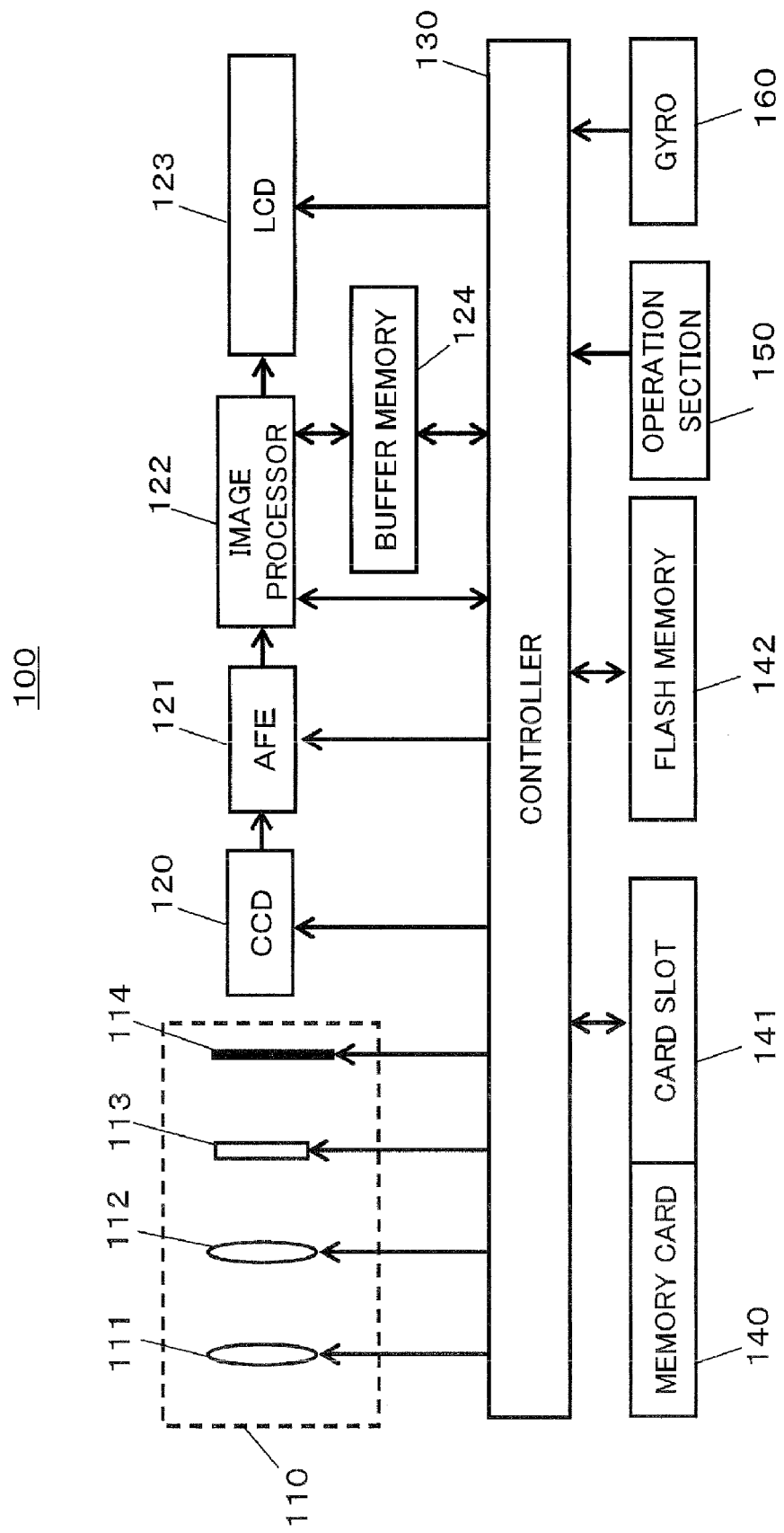
FIG. 1 is a diagram illustrating a configuration of a digital camera according to a first embodiment.

FIG. 1 is a diagram illustrating a configuration of the digital camera 100. The digital camera 100 captures a subject image formed via an optical system 110 using a CCD image sensor 120. The CCD image sensor 120 generates image data based on the captured subject image. The image data generated by the capturing operation is subject to various processes in an analog front end (AFE) 121 and an image processor 122. The image data is stored in a flash memory 142 or a memory card 140. The image data stored in the flash memory 142 or the memory card 140 is reproduced to be displayed on a liquid crystal display (LCD) 123 in response to a user's operation of an operation section 150.

The optical system 110 includes a focus lens 111, a zoom lens 112, a diaphragm 113, and a shutter 114. Although not shown in the figure, the optical system 110 may include OIS (Optical Image Stabilizer) which is a lens for optical correction of a camera shake. The various lenses composing the optical system 110 may be composed of any number of lenses, or any number of groups of lenses.

The focus lens 111 is used for adjusting a focal distance. The zoom lens 112 is used for adjusting magnification of enlargement and reduction. The diaphragm 113 is used for regulating an amount of light incident on the CCD image sensor 120. The shutter 114 regulates an exposure time of the light incident on the CCD image sensor 120. The focus lens 111, the zoom lens 112, the diaphragm 113, and the shutter 114 are driven by the respective drivers (not shown), such as a DC motor or a stepping motor, according to a control signal sent from a controller 130.

The CCD image sensor 120 captures a subject image formed through the optical system 110 to generate image data. The CCD image sensor 120 generates image data of a new frame every constant time (for example, 1/60 sec.). The CCD image sensor 120 regulates an amount of exposure light by means of an operation of an electronic shutter. Instead of the CCD image sensor 120, other imaging devices such as a CMOS image sensor and an NMOS image sensor may be used.

The analog front end 121 executes preprocessing such as correlation double sampling and gain adjustment on the image data generated by the CCD image sensor 120. Further, the analog front end 121 coverts analog type image data into digital type image data. Thereafter, the analog front end 121 outputs the image data to the image processor 122.

The image processor 122 executes predetermined image processes on the image data that is subject to the preprocessing. The predetermined image processes include, but not limited to, gamma correction, white balance correction, a YC converting process, an electronic zoom process, a compressing process, and an expanding process. Some of these processes may be omitted. The image processor 122 may be composed of a hard-wired electronic circuit or by a microcomputer or the like using a program. The image processor 122 as well as the controller 130 may be integrated onto one semiconductor chip.

The controller 130 generally controls the entire operation of the digital camera 100. The controller 130 is composed of a ROM (not shown) for storing information about a program, and a CPU (not shown) for processing information about a program. The ROM stores programs relating to focus control and exposure control as well as a program for generally controlling the entire operation of the digital camera 100.

The controller 130 may be composed of a hard-wired electronic circuit or by a microcomputer or the like. The controller 130 as well as the image processor 122 may be integrated to one semiconductor chip. Further, the ROM does not have to be an internal component of the controller 130, and may be provided to the outside of the controller 130.

A buffer memory 124 is a storage unit that functions as a work memory of the image processor 122 or the controller 130. The buffer memory 124 can be realized by DRAM (Dynamic Random Access Memory) or the like.

The flash memory 142 functions as an internal memory for storing image data. The controller 130 stores image data processed by the image processor 122 into the flash memory 142 or the memory card 140.

A card slot 141 is a connecting unit to which the memory card 140 can be attached. The card slot 141 is a unit that can electrically or mechanically connect the memory card 140 to the digital camera 100. The card slot 141 may have a function for controlling the memory card 140.

The memory card 140 is an external memory that has a storage device such as a flash memory, therein. The memory card 140 can store data such as image data processed by the image processor 122. In the embodiment, the memory 140 is described as one example of the external memory, but the external memory is not limited to this. For example, a storage medium such as an optical disk may be used as the external memory.

Figure 2:
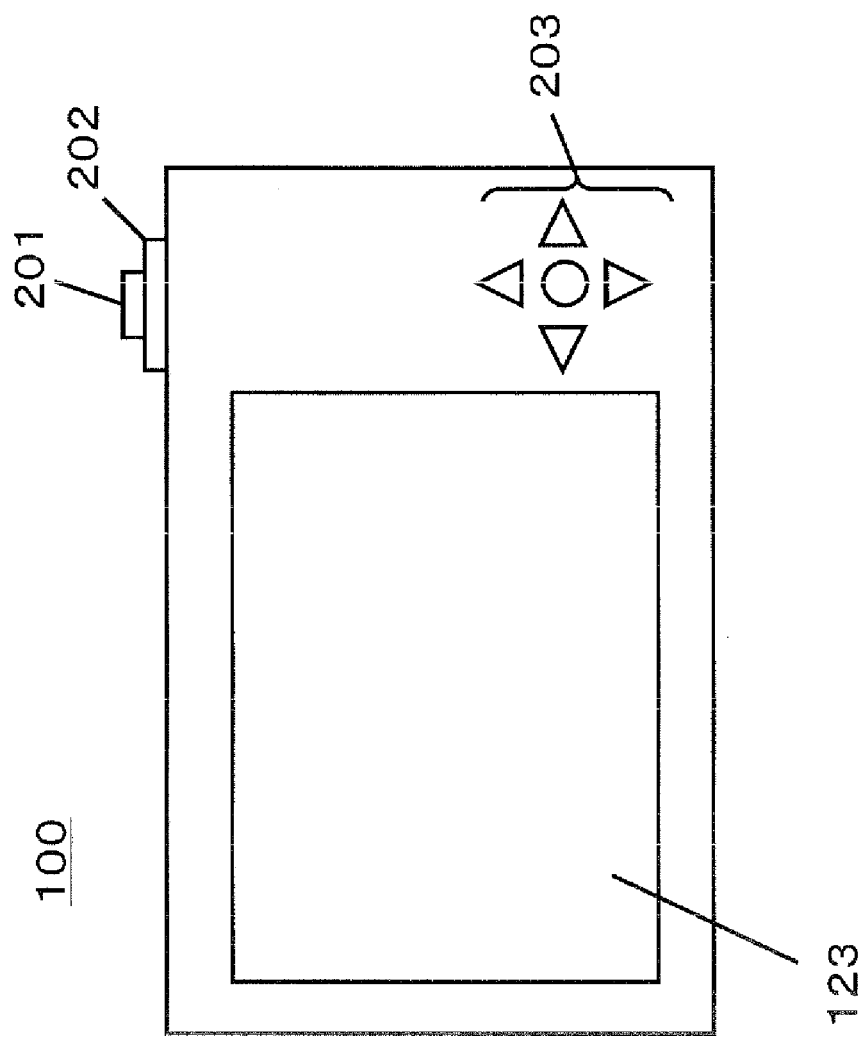
FIG. 2 is a rear view of the digital camera according to the first embodiment.

The operation section 150 includes an operation buttons and an operation dial provided to the digital camera 100, and receives user's operations for the digital camera 100. As shown in FIG. 2 for example, the release button 201 and a zoom dial 202 provided to an upper surface of a camera body, or a select button 203 provided to a rear surface of the camera body correspond to the operation section 150. When the operation section 150 receives user's operations, it transmits various instruction signals to the controller 130.

The liquid crystal display 123 is provided to the rear surface of the digital camera 100. The liquid crystal display 123 displays an image based on the image data processed by the image processor 122. The image displayed on the liquid crystal display 123 includes a through image and a stored image. The through image is an image which is formed by displaying successively a new frame generated at every constant time by the CCD image sensor 120. The user can take a picture while confirming a subject composition by referring to the through image displayed on the liquid crystal display 123. The stored image is an image stored in the memory card 140 or the flash memory 142. The liquid crystal display 123 displays an image based on the stored image data according to user's operation. Further, the liquid crystal display 123 can display setting conditions or the like of the digital camera 100 as well as images.

A gyro 160 is a sensor for detecting a shake in a yawing direction and a shake in a pitching direction based on a change in an angle of the digital camera 100 per unit time, namely, an angular velocity. The gyro 160 outputs a gyro signal representing an amount of the detected shake to the controller 130. In the first embodiment, during the operation of the digital camera 100, the gyro 160 sequentially (at least before the release button 201 is operated) detects a shake and outputs the gyro signal to the controller 130.

1.1. Correspondence of Terms

The CCD image sensor 120 is one example of an imaging unit. The memory card 140 is one example of a recording medium. A combination of the shutter 114 and the controller is one example of a regulating unit. The combination including the gyro 160 and the controller 130 is one example of a shake detector. The release button 201 is one example of an operation unit. The controller 130 is one example of a controller and an illuminance acquiring unit. The digital camera 100 is one example of an imaging apparatus.

2. Operation of Digital Camera

Figure 3:
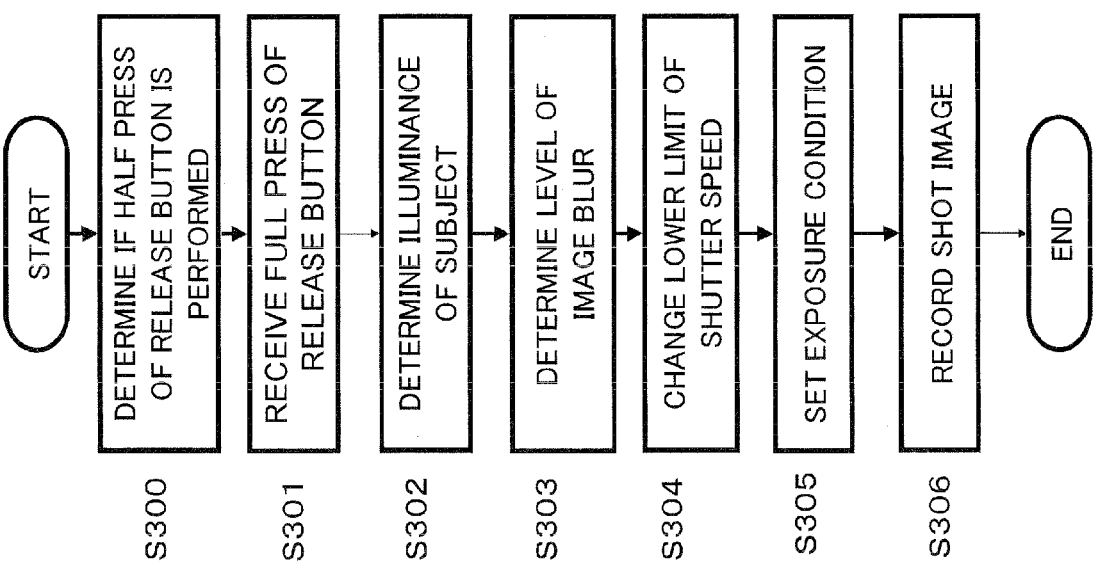
FIG. 3 is a flowchart illustrating an operation of the digital camera according to the first embodiment.

The operation of the digital camera 100 will be described below 2-1. Outline of Operation FIG. 3 is a flowchart illustrating an outline of the operation of the digital camera 100 according to the first embodiment. The outline of the operation of the digital camera 100 will be described with reference to FIG. 3.

The controller 130 determines whether or not the release button 201 is half pressed by a user (S300). The determination of half press of the release button 201 is carried out until the controller 130 accepts full press of the release button 201. When the controller 130 receives the full press of the release button 201 by the user (S301), a result of determining the half press of the release button 201 is fixed.

The controller 130 then determines illuminance of a subject based on the image data generated at timing just before the full press of the release button 201 (S302).

The controller 130 always (at least before the release button 201 is operated) calculates a level of image blur based on a change in a gyro signal from the gyro 160 and a set focal distance, regardless of user's operation of the release button 201. The controller 130 adopts the level of the image blur that is calculated just before receiving the full press of the release button 201, as the result of determining the level of the image blur (S303).

The controller 130 changes a lower limit of a selectable shutter speed based on the determination of performing/non-performing the half press of the release button, illuminance, and level of the image blur (S304). The controller 130 sets a suitable exposure condition in consideration of the lower limit of the changed shutter speed (S305).

The setting of the shutter speed is described. The controller 130 has a function for setting the suitable shutter speed based on sensitivity of the CCD 120, the illuminance of a subject, a shooting mode, and the like, except for the case where the user manually sets the shutter speed. In that case, the settable lower limit of the shutter speed is separately set. In the first embodiment, the lower limit of the shutter speed is suitably changed based on the performing/non-performing of the half press of the release button, the illuminance, and the level of the image blur.

Finally, the controller 130 stores the image data captured and generated under the set exposure condition into the memory card 140 (S306).

The above described respective operations will be described in detail below.

2-1-1. Determination of Performing/Non-Performing of Half Press

Figure 4:
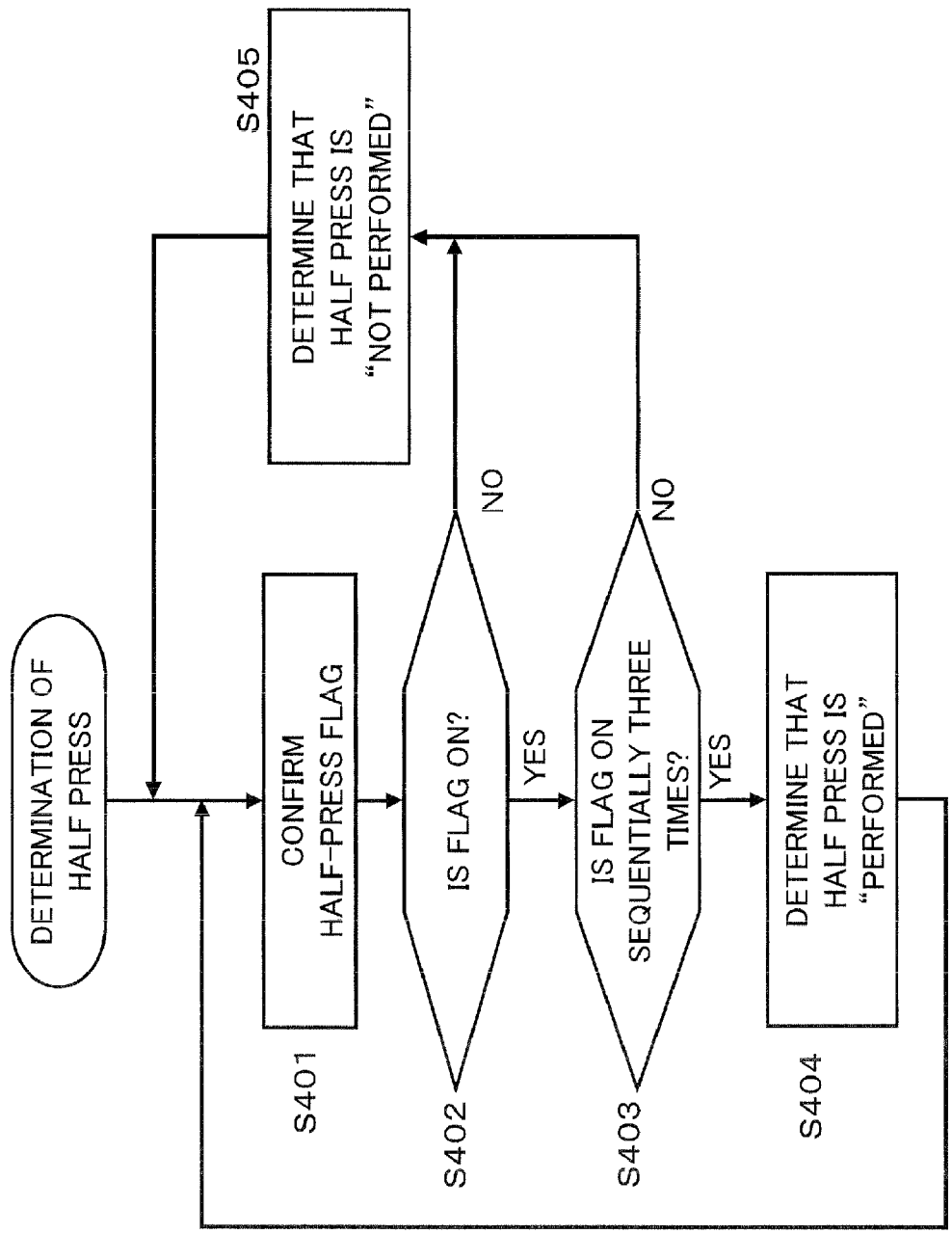
FIG. 4 is a flowchart illustrating a process for determining whether half press is performed.

FIG. 4 is a flowchart illustrating the process for determining the performing/non-performing of the half press of the release button 201 (step S300 in FIG. 3). The process for determining the performing/non-performing of the half press will be described with reference to FIG. 4.

When the release button 201 is pressed half by a user, a half press signal is transmitted from the release button 201, and a flag representing that the half press signal is received (hereinafter, referred to as the "half-press flag") is set at a port of the controller 130. That is, the half-press flag is set to ON. When the half press state of the release button 201 is cancelled, the transmission of the half press signal is stopped, and the half-press flag is set to "OFF".

The controller 130 confirms the half-press flag at the port every predetermined time (in this example, every 10 msec.) (S401). When the half-press flag is "OFF", the controller 130 determines that the half press is "not performed" (S405).

The controller 130 confirms the half-press flag at the port at every predetermined time (10 msec.) to determine whether or not the half-press flag is "ON" sequentially three times (S403). When the half-press flag is ON sequentially three times at the port, the controller 130 determines that the half press is "performed" (S404). On the other hand, when it is not confirmed that the half-press flag is ON sequentially three times, the controller 130 determines that the half press is "not performed" (S405). That is, even in the case where the determination is made that the half press is once "performed", when the half-press flag is not ON sequentially three times at the port, the controller 130 determines that the half press is "not performed".

In the above manner, the half press of the release button 201 is determined by the operations from step S401 to step S405. On the other hand, when the release button 201 is fully pressed, it is determined that the full press of the release button 201 is performed, interrupting the operation for determining the half press. The controller 130 periodically repeats the determination of the performing/non-performing of the half press of the release button 201 until the full press is received. When it is determined that the full press of the release button 201 is performed and if it is determined that the half press is "performed", the half press is defined to be "performed". Further, when the full press of the release button 201 is determined and if it is determined that the half press is "not performed", the half press is defined to be "not performed".

In the above method, the controller 130 can determine whether or not the full press operation of the release button 201 is performed in one operation without the half press or performed via the half press. Since the determination result as to performing/non-performing of the half press is fixed at the time of the full press of the release button 201, the controller 130 can make instantaneous control according to user's operating condition.

In the above method, when the half-press flag is ON sequentially three times, it is determined that the half press is "performed", but the determination method is not limited to this method. That is, as long as the performing/non-performing of the half press can be determined, the number of determination times for the half-press flag is not limited to three times.

2-1-2. Determination of Illuminance of Subject

Figure 5:
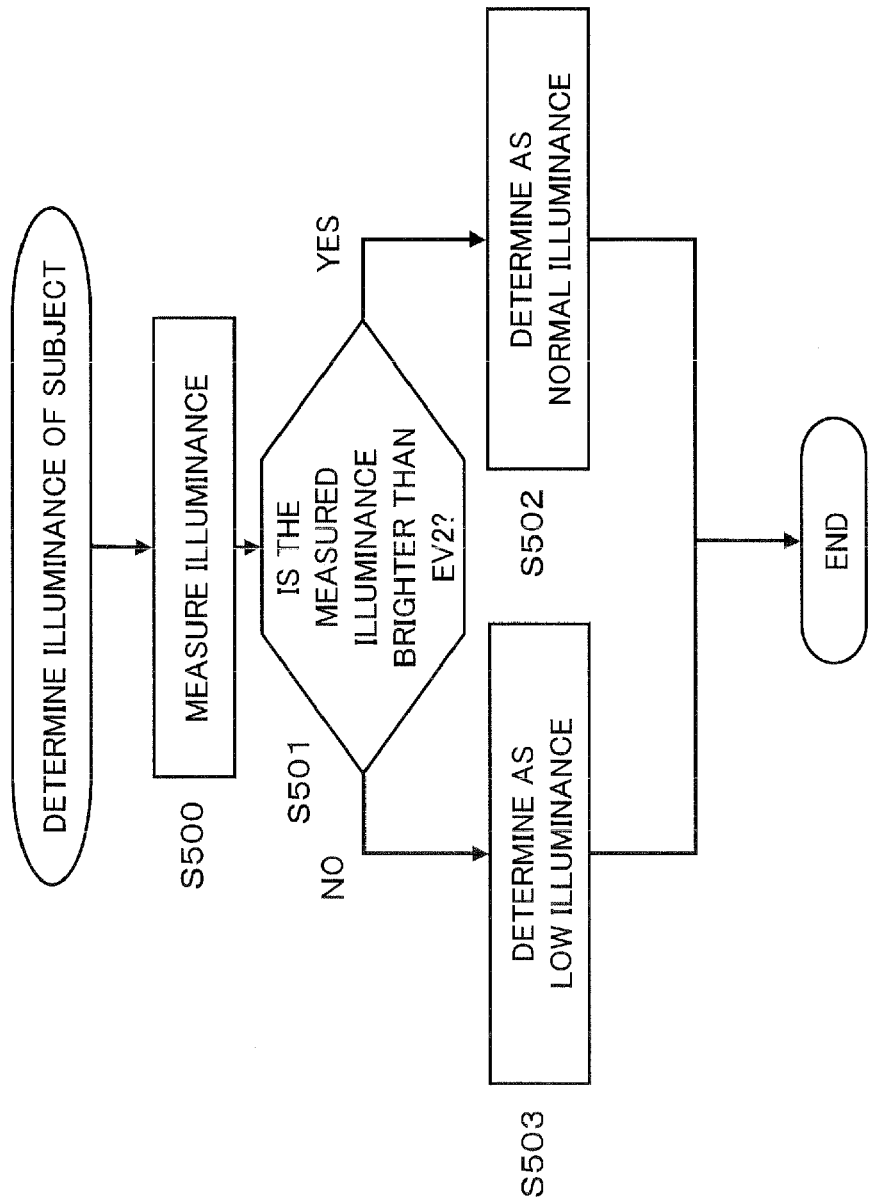
FIG. 5 is a flowchart illustrating a process for determining illuminance.

FIG. 5 is a flowchart illustrating the process for determining the illuminance of a subject (step S302 in FIG. 3). The process for determining the illuminance of a subject will be described with reference to FIG. 5.

The controller 130 measures illuminance of the image data generated by the COD image sensor 120 (S500). The controller 130 then determines whether or not the measured illuminance is brighter than EV2 (S501).

When the measured illuminance is brighter than EV2, the controller 130 determines that the illuminance of the captured subject image is "normal illuminance" (S502). On the other hand, when the measured illuminance is darker than EV2, the controller 130 determines that the illuminance of the captured subject image is "low illuminance" (S503). When it is determined as low illuminance, the controller 130 classifies the illuminance of the subject image more finely based on the illuminance value (EV value). This is because the exposure time is set more suitably since, as the illuminance becomes lower, the exposure time for obtaining the suitable exposure becomes longer to cause the image blur to easily occur.

2-1-3. Determination of Level of Image Blur

FIG. 6 is a diagram describing the process for determining the level of image blur (step S303 in FIG. 3). The determination of the level of image blur is described with reference to FIG. 6.

The controller 130 calculates an amount of image blur based on the output signal from the gyro 160 and the current focal distance determined by the optical system. This is because the amount of blur of a subject image changes according to the level of zoom and the amount of the camera shake. For example, with the same amount of the camera shake detected by the gyro 160, the blur amount of a subject image becomes larger, as the zoom magnification becomes higher (namely, the focal distance is longer). The amount of image blur is calculated while converted to a number of pixels of the CCD image sensor 120.

In the first embodiment, as shown in FIG. 6, the level of the image blur is set to four stages of 0 to 3, and the controller 130 determines the level of the image blur according to the amount of the image blur. For example, when the amount of the image blur is one to five pixels, the level of the image blur is determined as 0. When the amount of the image blur is sixteen or more pixels, the level of the image blur is determined as 3.

Since a fluctuation in a waveform of the output signal from the gyro 160 is large, the controller 130 should stabilize the output signal with time constant. For this reason, the controller 130 applies a low-pass filter to the gyro signal received in time series, and uses the result as the output signal form the gyro 160.

The controller 130 adopts the level of the image blur at the time of the full press of the release button 201 as information for regulating the exposure time. The controller 130 receives the full press of the release button 201 and then performs the shooting operation. Thus, use of the level of the image blur at the time of the full press of the release button 201 allows the controller 130 to set the exposure time more suitable for a subject image to be shot.

A table shown in FIG. 6 is one example, and the idea of the first embodiment is not limited to the values shown in FIG. 6.

In order to accurately detect blur, a certain length of sampling time for detecting blur should be secured. In the camera of Japanese Patent No. 3550608, when the half press of the release button is detected, blur is started to be detected. For this reason, when a user fully presses the release button in one operation without the half press, the sampling time for detecting blur cannot be sufficiently secured, and thus the control based on the blur detection cannot be accurately made. On the contrary, the controller 130 according to the first embodiment sequentially (at least before the release button 201 is operated) detects the level of image blur regardless whether or not the user operates the release button 201. For this reason, the controller 130 can secure the sampling time for blur detection sufficiently, and the stable output result from the gyro 160 can be obtained at time constant. This enables the control based on the blur detection to be made accurately.

2-1-4. Change in Lower Limit of Shutter Speed

FIG. 7 is a diagram illustrating examples of the set values of the lower limit of shutter speed in a process for changing the lower limit of shutter speed (step S304 in FIG. 3) by means of the digital camera 100 according to the first embodiment. The process for changing the lower limit of shutter speed is described with reference to FIG. 7.

As described above, the controller 130 determines the lower limit of shutter speed based on the determination result of performing/non-performing of the half press of the release button 210, the illuminance, and the level of the image blur. As shown in FIG. 7, when the illuminance or the level of image blur is not changed, the lower limit of shutter speed in the case where the half press is not performed set to a value faster (smaller) than a value in the case where the half press is performed. In whole, as the amount of image blur is larger, the lower limit of shutter speed tends to be set a faster (smaller) value. In whole, as the illuminance is higher, the lower limit shutter speed tends to be set to a faster (smaller) value. It is considered that the camera shake amount is larger in the case where the release button 210 is fully pressed in one operation without the half press than the case where the half press is performed. Accordingly, the lower limit of shutter speed without the half press is set to a faster value so that an influence of the camera shake upon the image blur is reduced.

Concretely, for example, when the half press is "performed", the level of image blur is "0", and the illuminance is normal illuminance, the lower limit of shutter speed is set to ⅛ sec. Further, for example, when the half press is "not performed", the level of image blur is "3", and the illuminance is low, the lower limit of shutter speed is set to ⅟30 sec.

When the illuminance of the subject is "low", the set value of the lower limit of shutter speed is set finely according to the illuminance value (EV value). For example, when the illuminance is low, the half press is "performed", the level of image blur is "2", the lower limit of shutter speed is set to ½ sec with the EV of "0". When the EV is "1", the lower limit of shutter speed is set to ¼ sec, and when EV is "2", the lower limit of shutter speed is set to ⅛ sec. In this manner, with the low illuminance, the lower limit of shutter speed is set finely at each illuminance value (EV value), so that the exposure time can be set more suitably.

The table shown in FIG. 7 is one example, and the idea of the first embodiment is not limited to the values shown in FIG. 7.

The controller 130 adjusts ISO sensitivity for the determined shutter speed in order to obtain suitable exposure. The controller 130 stores the image data which is captured with the exposure conditions determined in such a manner and generated, in the memory card 140.

It is effective particularly for shooting night scene to determine the lower limit of shutter speed based on the determination of performing/non-performing of the half press, the illuminance of a subject, and the level of image blur. In the case of the night scene shooting, as the shutter speed is slower, more beautiful picture can be shot, but the slow shutter speed increases an influence upon the image blur. However, with the digital camera 100 according to the embodiment, even in the case of the night scene shooting, when the level of image blur is low, the shutter speed can be set as slow as possible within a range where the influence of the image blur is allowed.

Further, in general, most of beginner camera users fully press the release button 201 in one operation for shooting without the half press of the release button 201. When the release button 201 is fully pressed in one operation, the blur of the digital camera 100 is likely to become large. Since beginner camera users are not accustomed to holding cameras, the camera body shake is likely to become large at the time of pressing the release button 201. In this manner, the beginner camera users are likely to cause image blur at the time of taking a picture. However, in the digital camera 100 according to the embodiment, when the release button 201 is fully pressed, the performing/non-performing of the half press and the level of image blur are determined. Even when the half press is not performed, the suitable exposure time can be set. Since the performing/non-performing of the half press of the release button and the level of image blur are already determined at the moment when the user fully presses the release button 201, the exposure time can be set instantaneously. Hence, the digital camera 100 according to the embodiment can reduce the possibility that the image blur occurs at the time of shooting even by the beginner camera users.

3. Conclusion

The digital camera 100 according to the first embodiment includes the CCD image sensor 120 to capture a subject image generated via an optical system 110 and generate image data, a card slot 141 to record the generated image data in the memory card 140, combination of the shutter 114 and the controller 130 to regulate an exposure time for the CCD image sensor 120, combination of the gyro 160 and the controller 130 to detect a shake of the digital camera 100, the release button 201 operated by a user and capable of being in a half press state and a full press state, and the controller 130 to control the card slot 141 to record the image data generated by the CCD image sensor 120 in the memory card 140, when the release button 201 is in the full press state. The controller 130 determines whether or not the release button 201 is in the half press state before the full press state, and regulates an exposure time of the CCD image sensor 120 based on the determination result and the shake of the digital camera 100 detected by the combination of the gyro 160 and the controller 130. With this arrangement, the digital camera 100 can suitably regulates the exposure time based on the determined result of the performing/non-performing of the half press and the detected result of the image blur, when the release button 201 is fully pressed.

Other Embodiments

The digital camera 100 may further have a scene distinction unit for recognizing a scene of a subject. For example, a scene such as a night scene without a person, a night scene with a person, and scenes other than the night scene may be recognized, and the lower limit of shutter speed may be set in consideration of the recognized scene. For example, as shown in FIG. 8, the lower limit of speed shutter for each recognized scene may be set in the table. In the case of the night scene, since the illuminance of a subject is low, the shutter speed is set to the lower limit value.

In the first embodiment, the lower limit of the settable shutter speed is changed for regulating the exposure time. Instead of the lower limit of the settable shutter speed, the value of the shutter speed which is being set at the full press of the release button may be changed.

The idea of the embodiments described above can be applied also to an imaging apparatus other than the digital camera. That is, it goes without saying that the above idea can be applied also to an imaging apparatus, such as movie camera and mobile telephone with camera, capable of capturing images and having the function for detecting a shake of the imaging apparatus.

Industrial Applicability

The embodiment is useful for an imaging apparatus mounted with a device for detecting a shake of the imaging apparatus, such as digital camera, movie camera, and mobile telephone with camera.

What is claimed is:

1. An imaging apparatus comprising:
    an imaging unit operable to capture a subject image via an optical system and generate image data;
    a recording unit operable to record the image data generated by the imaging unit in a recording medium;
    a regulating unit operable to regulate an exposure amount for the imaging unit;
    a shake detector operable to detect a shake of the imaging apparatus;
    an operation unit capable of being in a first operating state and a second operating state; and
    a controller operable to control the recording unit to record the image data generated by the imaging unit in the recording medium, when the operation unit is in the first operating state,
    wherein the controller determines whether or not the operation unit is in the second operating state before the first operating state, and regulates an exposure time of the regulating unit based on the determination result and the shake of the imaging apparatus detected by the shake detector so that exposure time to be regulated, when it is determined that the operation unit is not in the second operating state before the first operating state, is shorter than an exposure time to be regulated when it is determined that the operation unit is in the second operating state before the first state.

2. The imaging apparatus according to claim 1, wherein the controller regulates the exposure time based on the determination result and the shake of the imaging apparatus detected by the shake detector when the operation unit is in the first operating state.

3. The imaging apparatus according to claim 1, wherein the controller regulates the exposure time so that the exposure time becomes shorter as the shake of the imaging apparatus detected by the shake detector is larger.

4. The imaging apparatus according to claim 1, further comprising an illuminance acquiring unit operable to acquire information about illuminance of the subject from the image data, wherein
    the controller regulates the exposure time, based on the illuminance as well as the determination result and the shake of the imaging apparatus detected by the shake detector.

5. The imaging apparatus according to claim 1, wherein the controller regulates the exposure time, based on a focal distance defined by the optical system as well as the determination result and the shake of the imaging apparatus detected by the shake detector.

6. The imaging apparatus according to claim 1, wherein the second operating state of the operation unit is a state to instruct start of an autofocus operation.

7. The imaging apparatus according to claim 1, wherein the controller sets a lower limit of a settable shutter speed for regulating the exposure time.

8. The imaging apparatus according to claim 1, wherein the shake detector detects shake before the operation unit is operated by a user.

9. An imaging apparatus comprising:
    an imaging unit operable to capture a subject image via an optical system and generate image data;
    a recording unit operable to record the image data generated by the imaging unit in a recording medium;
    a regulating unit operable to regulate an exposure amount for the imaging unit;
    an acquiring unit operable to acquire information about a shake of the imaging apparatus;
    an operation unit capable of being in a first operating state and a second operating state; and
    a controller operable to control the recording unit to record the image data generated by the imaging unit in the recording medium, when the operation unit is in the first operating state,
    wherein the controller determines whether or not the operation unit is in the second operating state before the first operating state, and regulates an exposure time of the regulating unit based on the determination result and the information about the shake of the imaging apparatus acquired by the acquiring unit so that exposure time to be regulated, when it is determined that the operation unit is not in the second operating state before the first operating state, is shorter than an exposure time to be regulated when it is determined that the operation unit is in the second operating state before the first operating state.

10. An imaging apparatus comprising:
    an imaging unit operable to capture a subject image via an optical system and generate image data;
    a recording unit operable to record the image data generated by the imaging unit in a recording medium;
    a regulating unit operable to regulate an exposure amount for the imaging unit;
    an operation unit capable of being in a first operating state and a second operating state; and a controller operable to control the recording unit to start recording of the image data generated by the imaging unit in the recording medium, when the operation unit is in the first operating state, wherein the controller determines whether or not the operation unit is in the second operating state before the first operating state, and regulates an exposure time of the regulating unit based on the determination result so that exposure time to be regulated, when it is determined that the operation unit is not in the second operating state before the first operating state, is shorter than an exposure time to be regulated when it is determined that the operation unit is in the second operating state before the first operating state.

11. The imaging apparatus according to claim 1, wherein the controller detects whether or not the operation unit is in the second operating state at predetermined times, and when it is sequentially detected a predetermined number of times that the operation unit is in the second operating state, the controller determines that the operation unit is in the second operating state.

* * * * *

UNITED STATES PATENT AND TRADEMARK OFFICE
CERTIFICATE OF CORRECTION

| | | |
|---|---|---|
| PATENT NO. | : 8,345,150 B2 | |
| APPLICATION NO. | : 12/842236 | |
| DATED | : January 1, 2013 | |
| INVENTOR(S) | : Hiroyuki Kojima et al. | |

It is certified that error appears in the above-identified patent and that said Letters Patent is hereby corrected as shown below:

In Column 9, Lines 63-65, related to Claims,

"...when it is determined that the operation unit is in the second operating state before the first state." should read
--when it is determined that the operation unit is in the second operating state before the first operating state.--

Signed and Sealed this
Fourteenth Day of May, 2013

Teresa Stanek Rea
*Acting Director of the United States Patent and Trademark Office*